(12) United States Patent
Mineaud et al.

(10) Patent No.: US 6,561,893 B2
(45) Date of Patent: May 13, 2003

(54) DEVICE FOR DELIVERING CONDITIONED AIR INTO A PASSENGER AREA OF A RAIL VEHICLE

(75) Inventors: Gérard Mineaud, Pinchon (FR); Daniel Plichon, Viete (FR)

(73) Assignee: Alstom, Paris (FR)

( * ) Notice: Subject to any disclaimer, the term of this patent is extended or adjusted under 35 U.S.C. 154(b) by 0 days.

(21) Appl. No.: 10/252,052

(22) Filed: Sep. 23, 2002

(65) Prior Publication Data

US 2003/0068969 A1 Apr. 10, 2003

(30) Foreign Application Priority Data

Oct. 4, 2001 (FR) .............................. 01 12785

(51) Int. Cl.⁷ ................................................ B60H 1/00
(52) U.S. Cl. .......................... 454/103; 454/85; 454/93
(58) Field of Search ........................ 454/108, 85, 93, 454/95, 99, 103, 104

(56) References Cited

U.S. PATENT DOCUMENTS

| | | | | |
|---|---|---|---|---|
| 992,956 A | * | 5/1911 | Greenburg | 454/104 |
| 1,073,091 A | * | 9/1913 | Carence | 454/85 |
| 1,104,816 A | * | 7/1914 | Miller | 454/104 |
| 1,308,737 A | * | 7/1919 | Harrison | 454/103 |
| 2,338,363 A | * | 1/1944 | Strobell | 454/88 |
| 3,330,200 A | | 7/1967 | Gillick et al. | |
| 5,551,913 A | * | 9/1996 | Peifer | 454/121 |

FOREIGN PATENT DOCUMENTS

| | | |
|---|---|---|
| DE | 21 45 744 A | 7/1973 |
| EP | 0 239 548 A | 9/1987 |

\* cited by examiner

*Primary Examiner*—Ira S. Lazarus
*Assistant Examiner*—Derek Boles
(74) *Attorney, Agent, or Firm*—Sughrue Mion, PLLC

(57) ABSTRACT

A device for delivering conditioned air into a passenger area of a rail vehicle, said device comprising a duct extending along the bottom of a side wall of the passenger area, that side face of said duct which is adjacent to the inside of the passenger area being provided with air outlet means disposed over the entire length of the duct and designed so as to release a flow of air across the floor of the vehicle, the top of the duct being provided with openings opening out in a space defined laterally by two substantially parallel walls adjacent to the side wall of the vehicle, said space opening out via its top into the passenger area and its wall that is adjacent to the inside of the passenger area being provided, close to the duct, with one or more slots into which air contained in the passenger area is sucked, wherein said openings are distributed over the length of the duct such that air outlet zones provided with openings are disposed in alternation with barrier zones not provided with any openings, and wherein partitions extending between the parallel walls are disposed where the air outlet zones meet the barrier zones.

6 Claims, 4 Drawing Sheets

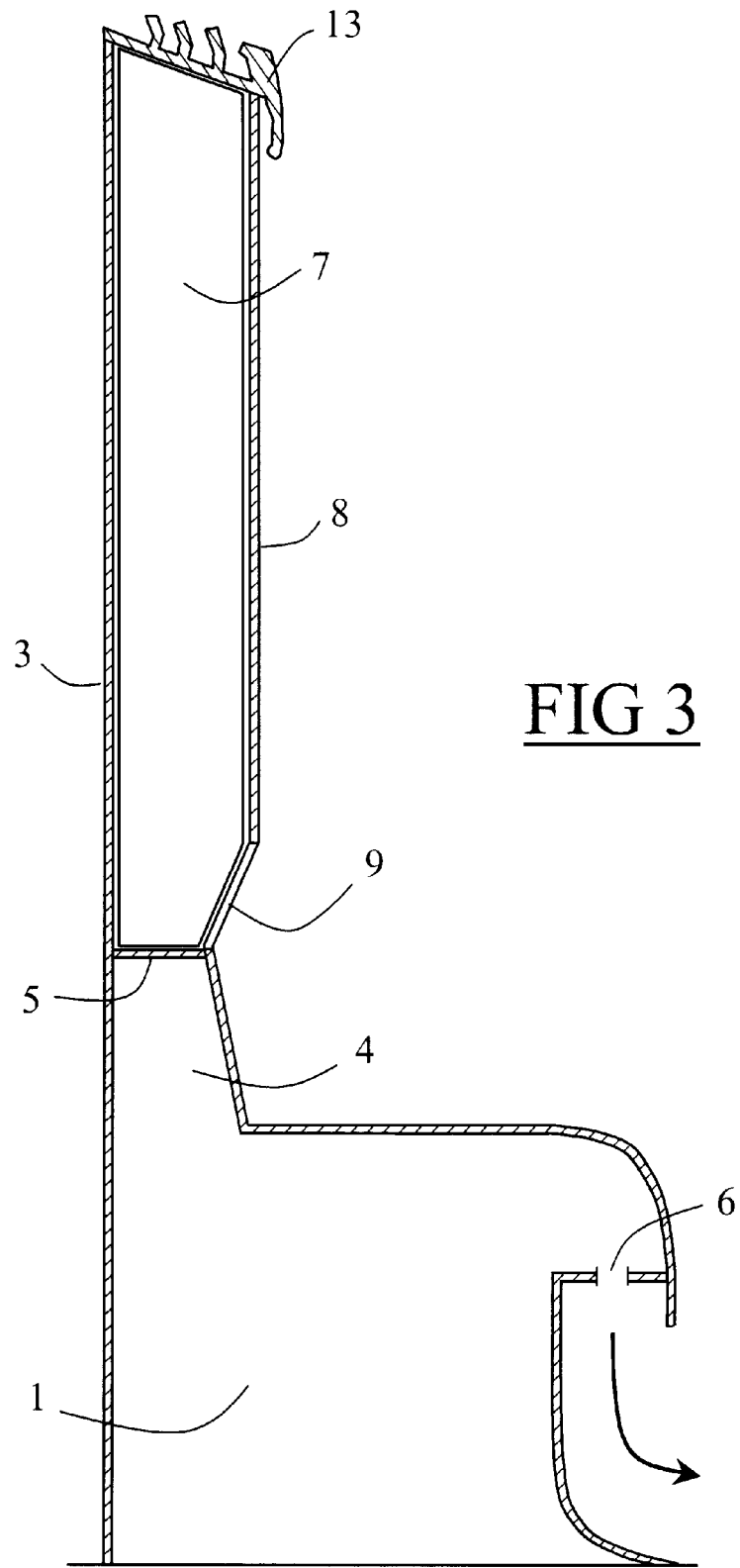

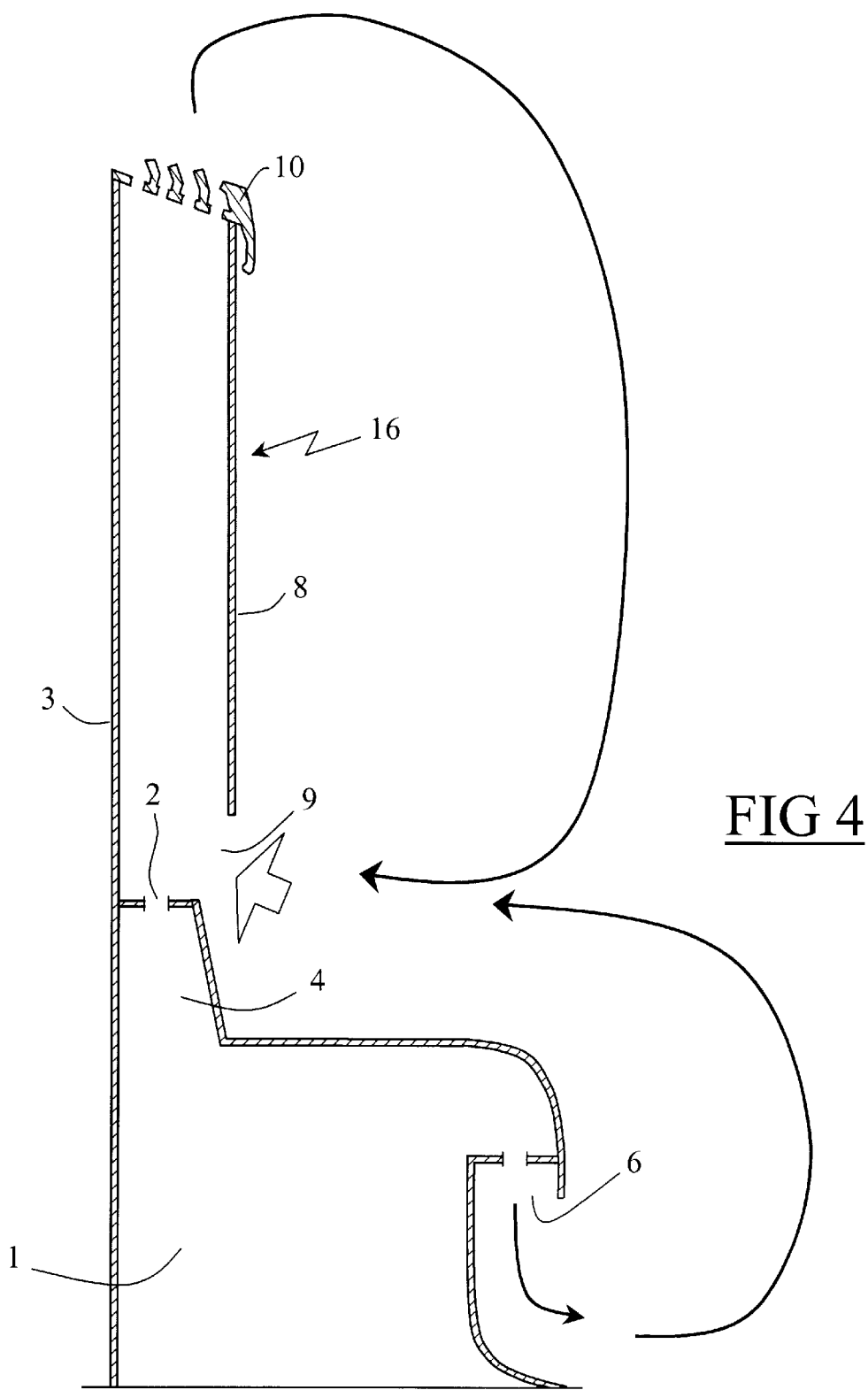

DEVICE FOR DELIVERING CONDITIONED AIR INTO A PASSENGER AREA OF A RAIL VEHICLE

The invention relates to a device for delivering conditioned air into a passenger area of a rail vehicle, the device comprising a duct that extends along the bottom of a side wall of the passenger area and that is provided with distribution means for distributing the air towards the top and the bottom of the side wall, which distribution means include an opening in an intermediate zone, air contained in the vehicle being sucked into the distribution means via said opening.

BACKGROUND OF THE INVENTION

Document FR-A1-2 632 593 discloses such a device for delivering conditioned air into a passenger area of a rail vehicle. In that device, the duct opens out via its top into a space defined by two parallel walls adjacent to the side wall of the passenger area and extending over the entire length of the passenger area. That space opens out via its top into the inside of the vehicle via gratings that are situated substantially level with the windows of the vehicle. Usually, one such conditioned air delivery device is installed on each side of the passenger area so as to deliver conditioned air to the various rows of seats disposed on either side of the central corridor.

In such a case, in order for the circulation of air to be comfortable, the air exiting from the gratings must successively flow along the side wall of the passenger area, be deflected by the ceiling or the luggage rack, flow almost horizontally to meet the flow coming from the other side of the passenger area in the midplane of the corridor, and then flow down towards the floor while remaining in said midplane.

However, the Applicant has observed that such an installation suffers from the drawback of being sensitive to differences in flow rate that exist between the feed ducts of the delivery devices disposed on either side of the passenger area, and to any thermal or physical disturbance which tends to unbalance the circulation of air on one side of the vehicle, thereby generating draughts that are unpleasant for passengers.

OBJECTS AND SUMMARY OF THE INVENTION

Therefore, an object of the present invention is to provide a device for delivering conditioned air into a passenger area that remedies those drawbacks, while guaranteeing that air is renewed stably and uniformly in the passenger area so as to offer improved comfort in the passenger area.

To this end, the invention provides a device for delivering conditioned air into a passenger area of a rail vehicle, said device comprising a duct extending along the bottom of a side wall of the passenger area, that side face of said duct which is adjacent to the inside of the passenger area being provided with air outlet means disposed over the entire length of the duct and designed so as to release a flow of air across the floor of the vehicle, the top of the duct being provided with openings opening out in a space defined laterally by two substantially parallel walls adjacent to the side wall of the vehicle, said space opening out via its top portion into the passenger area and its wall that is adjacent to the inside of the passenger area being provided, close to the duct, with one or more slots into which air contained in the passenger area is sucked, wherein said openings are distributed over the length of the duct such that air outlet zones provided with openings are disposed in alternation with barrier zones not provided with any openings, and wherein partitions extending between the parallel walls are disposed where the air outlet zones meet the barrier zones.

In particular embodiments, the conditioned air delivery device of the invention may have one or more of the following characteristics, taken in isolation or in any technically feasible combination:

- the wall that is towards the inside of the passenger area and that contributes to defining laterally the spaces into which the openings open out is a wall that extends over the entire length of the duct;
- the slots into which air contained in the passenger area is sucked are disposed only in register with the air outlet zones;
- the vehicle is provided with side windows disposed on either side of separating uprights, and the barrier zones are disposed in register with the separating uprights, the air outlet zones being disposed in register with the windows;
- the spaces in register with the air outlet zones open out into the passenger area via gratings disposed substantially level with the windows of the vehicle, said gratings being extended in register with the barrier zones by closed-off gratings;
- the barrier zones represent in the range 10% to 25% of the total length of the duct.

BRIEF DESCRIPTION OF THE DRAWINGS

The objects, features, and advantages of the present invention will be better understood on reading the following description of a particular embodiment of the invention, given by way of non-limiting example and with reference to the accompanying drawings, in which:

FIG. 3 is a cross-section view of the air delivery device on line III—III of FIG. 2; and FIG. 4 is a cross-section view of the air delivery device on line IV—IV of FIG. 2.

MORE DETAILED DESCRIPTION

Figure 1:
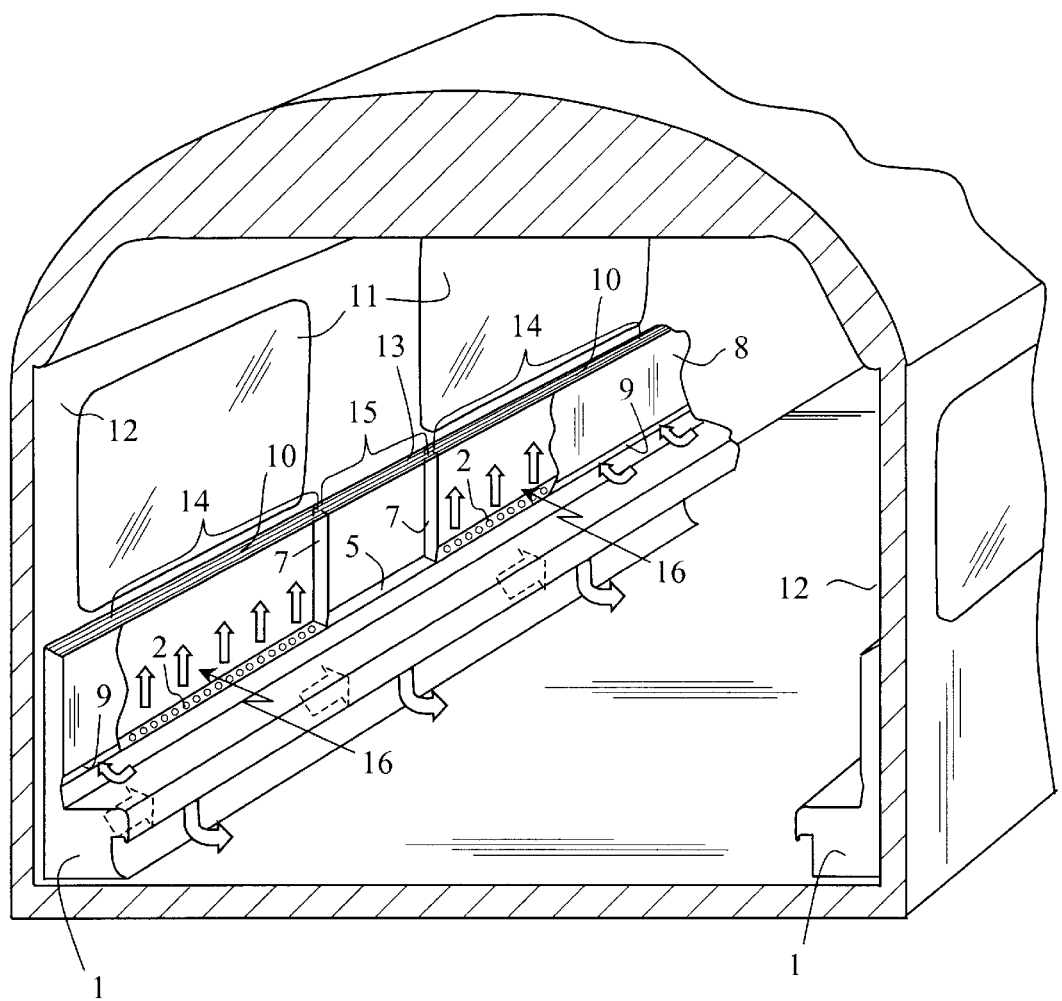
FIG. 1 is a diagrammatic perspective view showing an air delivery device in a particular embodiment of the invention, for delivering conditioned air inside a rail vehicle; in this figure, the inner wall of the air delivery device is shown cut away in part.
Figure 2:
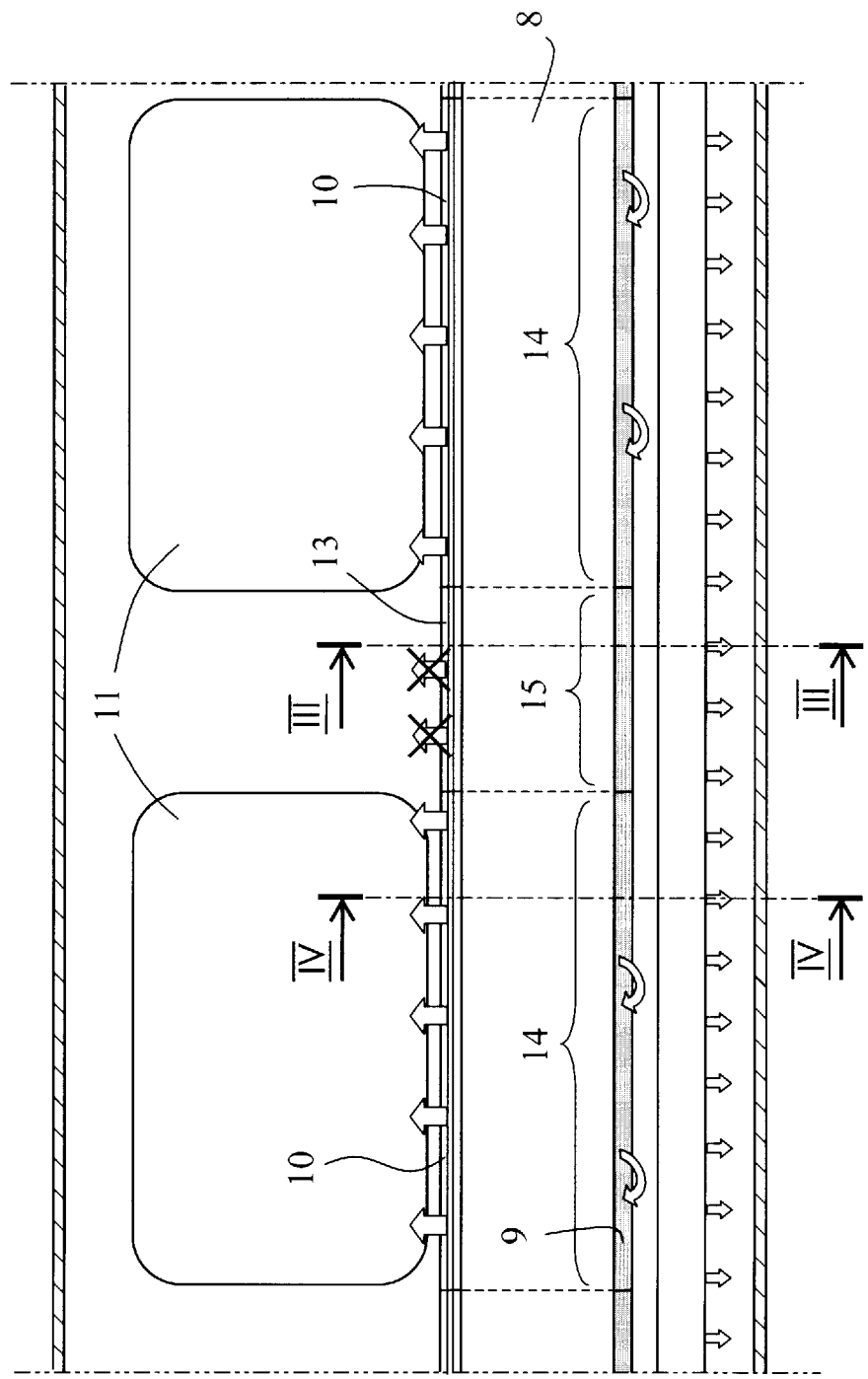
FIG. 2 is an axial section view of the rail vehicle of FIG. 1.

To make the drawing clearer, only those elements which are necessary to understand the invention are shown. Like elements have like references from one figure to another.

FIG. 1 shows a rail passenger vehicle having a passenger area designed to seat passengers on a plurality of rows of seats (not shown in the Figures) separated by a central corridor. The passenger area has two side walls 12 provided with windows 11, and, on the bottom portion of each of the walls 12, it receives a respective conditioned air delivery device.

In the description below, only one conditioned air delivery device is described, since the conditioned air delivery devices at the bottoms of both walls 12 are similar and are disposed symmetrically to each other.

As shown in FIGS. 1 to 4, the delivery device includes a duct 1 extending along the wall 12, over the entire length of the passenger area, and it is fed by an air-conditioning unit (not shown) which delivers hot air or cold air to one end of the duct in a flow direction indicated by dashed-line arrows in FIG. 1.

On its side face on the inside of the passenger area, the duct 1 is provided with a plurality of orifices 6 in the form of circular holes distributed uniformly over the entire length of the duct 1, and releasing a flow of air towards the floor, the flow of air being deflected by the base of the wall of the duct 1.

In its top portion adjacent to the wall 12 of the passenger area, the duct 1 is provided with a narrow channel 4 extending vertically and over the entire length of the duct 1. The narrow channel has a top end closed by a wall 5 which is provided locally with openings 2 in the form of circular holes opening out into a space defined laterally by two walls 3 and 8 that extend substantially parallel to the side wall 12 of the passenger area. The wall 8 that is towards the inside of the passenger area extends over the entire length of the duct 1, and the other wall 3 extends at least in register with the air outlet zones 14.

In the invention, the openings 2 are distributed over the wall 5 in non-uniform manner in order to form air outlet zones 14 provided with multiple openings 2 in alternation with barrier zones 15 that are not provided with any openings 2. In the example shown in FIG. 1, the air outlet zones 14 are disposed in register with the windows 11, and the barrier zones 15 are disposed in register with separating uprights between the windows.

Partitions 7 extending vertically between walls 3 and 8 are placed where the air outlet zones 14 meet the barrier zones 15, so that the space between the walls 3 and 8 forms compartments preventing the air injected in register with the air outlet zones 14 from crossing the barrier zones 15. The top ends of the walls 3 and 8 receive perforated gratings 10 in register with the air outlet zones 14, and gratings 13 that may optionally be closed off in register with the barrier zones 15, non closed-off gratings offering the advantage of procuring aesthetically-pleasing continuity for the air delivery device. The walls 3 and 8 and the partitions 7 disposed on either side of the air outlet zones 14 thus define convectors 16 which deliver vertical air flows through the gratings 10. In addition, at its bottom end, the wall 8 is provided with slots 9 extending at least over the entire length of each of the air outlet zones 14, or else over the entire length of the wall 8, and making it possible to suck some of the air from the passenger area into the convectors 16, due to the suction created by the vertical flows of air passing through the openings 2.

The resulting conditioned air delivery device offers the advantage of ensuring that the air in the passenger area is well mixed and thus of procuring a more uniform temperature for the masses of air in the passenger area. The air expelled from the convectors propagates both vertically towards the ceiling and also in part in the longitudinal direction of the passenger vehicle due to air flow being interrupted on either side of the convectors, which guarantees circulation that is naturally stable and insensitive to small differences in flow-rate between the two air delivery devices disposed at the bottom of each of the side walls of the passenger area.

In addition, by maintaining a flow of air at floor level, uniformly distributed over the entire length of the passenger area, it is possible for the floor to be brought to the desired temperature rapidly, in particular when the outside temperature drops, and for temperatures very close to ambient temperature to be maintained at the level of said floor, thereby offering good comfort at foot level.

Naturally, the invention is in no way limited to the embodiment described and shown, which embodiment is given merely by way of example. Modifications remain possible, in particular concerning the make up of the various elements, or the use of equivalent substitute techniques, without going beyond the scope of protection of the invention. Thus, in a variant embodiment, the series of circular openings disposed side-by-side for feeding air into the convectors, or for sending a flow of air towards the floor, may be replaced by a single opening extending over a length equivalent to the extent of the series of openings.

What is claimed is:

1. A device for delivering conditioned air into a passenger area of a rail vehicle, said device comprising a duct extending along the bottom of a side wall of the passenger area, that side face of said duct which is adjacent to the inside of the passenger area being provided with air outlet means disposed over the entire length of the duct and designed so as to release a flow of air across the floor of the vehicle, the top of the duct being provided with openings opening out in a space defined laterally by two substantially parallel walls adjacent to the side wall of the vehicle, said space opening out via its top into the passenger area and its wall that is adjacent to the inside of the passenger area being provided, close to the duct, with one or more slots into which air contained in the passenger area is sucked, wherein said openings are distributed over the length of the duct such that air outlet zones provided with openings are disposed in alternation with barrier zones not provided with any openings, and wherein partitions extending between the parallel walls are disposed where the air outlet zones meet the barrier zones.

2. A device for delivering conditioned air into a passenger area according to claim 1, wherein the wall that is towards the inside of the passenger area and that contributes to defining laterally the spaces into which the openings open out is a wall that extends over the entire length of the duct.

3. A device for delivering conditioned air into a passenger area according to claim 2, wherein the slots into which air contained in the passenger area is sucked are disposed only in register with the air outlet zones.

4. A device for delivering conditioned air into a passenger area according to claim 1, said vehicle being provided with side windows disposed on either side of separating uprights, wherein the barrier zones are disposed in register with the separating uprights and the air outlet zones are disposed in register with the windows.

5. A device for delivering conditioned air into a passenger area according to claim 2, wherein the spaces in register with the air outlet zones open out into the passenger area via gratings disposed substantially level with the windows of the vehicle, said gratings being extended in register with the barrier zones by closed-off gratings.

6. A device for delivering conditioned air into a passenger area according to claim 1, wherein the barrier zones represent in the range 10% to 25% of the total length of the duct.

* * * * *